United States Patent
Hernon

(10) Patent No.: US 12,148,069 B2
(45) Date of Patent: Nov. 19, 2024

(54) GEOMETRIC PHOTO DERIVED POLYGON MESH PATTERN PROCESS

(71) Applicant: NFB Research, LLC, Spring Hill, FL (US)

(72) Inventor: James Gary Hernon, Spring Hill, FL (US)

(73) Assignee: NFB RESEARCH, LLC, Spring Hill, FL (US)

( * ) Notice: Subject to any disclaimer, the term of this patent is extended or adjusted under 35 U.S.C. 154(b) by 0 days.

(21) Appl. No.: 18/618,382

(22) Filed: Mar. 27, 2024

(65) Prior Publication Data

US 2024/0331218 A1    Oct. 3, 2024

Related U.S. Application Data

(60) Provisional application No. 63/456,116, filed on Mar. 31, 2023.

(51) Int. Cl.
| | | |
|---|---|---|
| *G06T 3/18* | (2024.01) | |
| *G06T 11/00* | (2006.01) | |
| *G06V 10/46* | (2022.01) | |
| *G09G 5/06* | (2006.01) | |

(52) U.S. Cl.
CPC ............ *G06T 11/001* (2013.01); *G06T 3/18* (2024.01); *G06V 10/46* (2022.01); *G09G 5/06* (2013.01)

(58) Field of Classification Search
None
See application file for complete search history.

(56) References Cited

U.S. PATENT DOCUMENTS

| | | | |
|---|---|---|---|
| 4,576,904 A | 3/1986 | Anitole | |
| 6,867,154 B1* | 3/2005 | Lunsford | D06P 3/8219 2/5 |
| 8,420,206 B2 | 4/2013 | Bernegger et al. | |
| 9,322,620 B2 | 4/2016 | Maloney | |
| 9,835,415 B2 | 12/2017 | Kirkpatrick et al. | |
| 10,558,881 B2* | 2/2020 | Cho | H04N 5/2622 |
| 2004/0202846 A1* | 10/2004 | Conk | F41H 3/00 428/195.1 |
| 2009/0017269 A1 | 1/2009 | Johnson | |
| 2012/0132063 A1* | 5/2012 | Saucedo | F41H 3/00 89/938 |
| 2023/0015117 A1* | 1/2023 | Aberman | G06T 5/50 |

OTHER PUBLICATIONS

Ozgun, Ozlem; Cartesian Grid Mapper: Transformation Media for Modeling Arbitrary Curved Boundaries With Cartesian Grids; Oct. 13, 2014; IEEE Antennas and Wireless Propagation Letters, vol. 13, pp. 1771-1774; https://ieeexplore.ieee.org/stamp/stamp.jsp?tp=&arnumber=6919994 (Year: 2014).*

(Continued)

*Primary Examiner* — Joni Hsu
(74) *Attorney, Agent, or Firm* — Lippes Mathias LLP

(57) ABSTRACT

A technique for developing camouflage patterns is provided. The technique involves simulating a desired location's real world 3-dimensional depth and color by producing a 2-dimensional polygon mesh pattern derived from digital images of those locations. The generated pattern many then be reproduced in physical forms or in electronic or digital representations.

14 Claims, 9 Drawing Sheets

(56) References Cited

OTHER PUBLICATIONS https://soldiersystems.net/2011/09/13/camoscience-app-makes-custom-precision-camo-design-a-reality/ printed Mar. 29, 2023.
https://www.prnewswire.com/news-releases/camoscience-app-instantly-transforms-your-photos-into-custom-next-gen-camouflage-designs-116957168.html.
*Tschumperlé, D,—GREYC UMR CNRS 6072, Image Team. (C) Since Jul. 2008. GREY's Magic for Image Computing Polygonize (Energy) filter. A Full-Featured Open-Source Framework for Image Processing. Apply polygon effect on selected images. https://gmic.eu/reference/polygonize.html.

* cited by examiner

100

102

SELECT A REAL-WORLD SCENE, OTHER WORLDLY SCENE, LANDSCAPE, AI GENERATED IMAGE OR AN OBJECT OF SOME TYPE

104

ACQUIRE IMAGE OF THE SELECTION

106

THE MANIPULATION FOR THE SELECTED IMAGE MAY BE ADJUSTED TO FINER OR LARGER POLYGONS PRIOR TO MANIPULATION

108

IMAGE MANIPULATED FOR ACTIVE CONTOURS THROUGH FUNCTIONAL MINIMIZATION FOR IMAGE SEGMENTATION USING AN INITIAL CARTESIAN GRID

110

CARTESIAN GRID IS ITERATIVELY WARPED UNTIL THE GRID POINTS REACH THE IMAGE CONTOURS

GEOMETRIC PHOTO DERIVED POLYGON MESH PATTERN PROCESS

This application is based on and claims priority to and the benefit of U.S. provisional patent application Ser. No. 63/456,116, filed on Mar. 31, 2023, the disclosure of which is incorporated herein by reference in its entirety.

TECHNICAL FIELD

The present exemplary embodiments relate to manipulation of images, such as digital images, to simulate the real world to generate unique patterns suitable for camouflage or graphic art for reproduction in physical forms or electronic or digital representations. They find particular application, for example, in conjunction with camouflage patterns used to camouflage outdoorsmen and their equipment from game animals and will be described with particular reference thereto. However, it is to be appreciated that the present exemplary embodiments are also amenable to other applications such as, for example, in the military, to disguise equipment and personnel from opposing forces or the clothing market to provide a unique basis for fabric design.

BACKGROUND

There are several existing types of camouflage patterns used in, for example, the outdoor sporting and military arenas:
  Copied terrain colors using color splotches;
  Mimicked coats of various animal coats (stripes, spots, etc.) to blend in or disrupt the human figure;
  Photographic reproductions of trees, wooded areas or terrain; and,
  Digital (pixelated) color splotches (the most modern military type of camouflage).

One challenge of designing camouflage patterns is that the visual acuity of humans and animals differ greatly. Many animals see a different range of color than humans and the ability to see fine detail differs greatly. For example, most big game animals lack the visual acuity to see fine detail, whereas many predators see fine detail much better than humans. Because of this and other reasons, there is wide range of existing camouflage patterns that exist to address the challenges of disguising humans or other elements from humans or animals in varying terrains.

Also, the article https://soldiersystems.net/2011/09/13/camoscience-app-makes-custom-precision-camo-design-a-reality/describes making digitized camo patterns. U.S. Pat. No. 9,835,415 takes 3D models of objects and adds them to scenes. U.S. Pat. No. 8,420,206 layers images. U.S. Pat. No. 4,576,904 relates to hunting blinds. U.S. Pat. No. 9,322,620 adds 3D models on a picture of a scene. U.S. Patent Publication No. US 2009/0017269 describes camouflaging game calls rather than painting them.

Further, use in clothing is common with urban camo and popular among youth, e.g., see the news article: https://www.prnewswire.com/news-releases/camoscience-app-instantly-transforms-your-photos-into-custom-next-gen-camouflage-designs-116957168.html.

BRIEF DESCRIPTION

In one aspect of the presently described embodiments, a method for developing a camouflage pattern comprises capturing, receiving or selecting an image, manipulating the image for active contours through functional minimization using an initial cartesian grid, iteratively warping the initial cartesian grid until grid points reach the contours, converting the warped cartesian grid to a polygon mesh of the image, averaging all of the pixel colors encompassed by each polygon to represent the color of the respective polygons, selecting a portion of the image, adjusting polygon colors from the selected portion for range and palette, setting color depth, creating a repeating pattern of the selected portion, and outputting the repeating pattern.

In another aspect of the presently described embodiments, the image is a raster image.

In another aspect of the presently described embodiments, the outputting comprises outputting the repeating pattern in at least one of raster format or vector format.

In another aspect of the presently described embodiments, the method further comprises printing the repeating pattern on a dip transfer film, a fabric, vinyl wrap, or other print medium or performing direct transfer to objects.

In another aspect of the presently described embodiments, a system comprises at least one processor and at least one memory having stored thereon instructions or code that, when executed by the at least one processor, causes the system to manipulate an image for active contours through functional minimization using an initial artesian grid, iteratively warp the initial cartesian grid until grid points reach the contours, convert the warped cartesian grid to a polygon mesh of the image, average all of the pixel colors encompassed by each polygon to represent the color of the respective polygons, select a portion of the image, adjust polygon colors from the selected portion for range and palette, set color depth, create a repeating pattern of the selected portion, and output the repeating pattern.

In another aspect of the presently described embodiments, the image is a raster image.

In another aspect of the presently described embodiments, the repeating pattern is in at least one of raster format or vector format.

In another aspect of the presently described embodiments, the repeating pattern is output to a system to print the repeating pattern on a dip transfer film, a fabric, vinyl wrap, or other print media or perform direct transfer to objects.

In another aspect of the presently described embodiments, a non-transitory computer readable medium has computer executable instructions stored thereon that, when executed, cause a system to perform capturing, receiving or selecting an image, manipulating the image for active contours through functional minimization using an initial artesian grid, iteratively warping the initial cartesian grid until grid points reach the contours, converting the warped cartesian grid to a polygon mesh of the image, averaging all of the pixel colors encompassed by each polygon to represent the color of the respective polygons, selecting a portion of the image, adjusting polygon colors from the selected portion for range and palette, setting color depth, creating a repeating pattern of the selected portion, and outputting the repeating pattern.

In another aspect of the presently described embodiments, the image is a raster image.

In another aspect of the presently described embodiments, the outputting comprises outputting the repeating pattern in at least one of raster format or vector format.

In another aspect of the presently described embodiments, the system is further caused to perform printing the repeating pattern on a dip transfer film, a fabric, vinyl wrap, or other print medium or perform direct transfer to objects.

In another aspect of the presently described embodiments, an item is provided having thereon a camouflage pattern developed by a method comprising capturing, receiving or selecting an image, manipulating the image for active contours through functional minimization using an initial cartesian grid, iteratively warping the initial cartesian grid until grid points reach the contours, converting the warped cartesian grid to a polygon mesh of the image, averaging all of the pixel colors encompassed by each polygon to represent the color of the respective polygons, selecting a portion of the image, from the selected portion, adjusting polygon colors for range and palette, setting color depth, creating a repeating pattern of the selected portion, and outputting the repeating pattern.

In another aspect of the presently described embodiments, the item a comprises at least one of a hat, coat, shirt, pants, socks, pullover, sweatshirt, weapon, fabric, tarp, blanket, cover, sheet, equipment, gloves, helmet, footwear, tent, bag, duffel bag, backpack, purse, luggage, sack, sling bag, carrier, or wall.

BRIEF DESCRIPTION OF THE DRAWINGS

FIG. 1A is a flow chart illustrating an example method according to the presently described embodiments.

DETAILED DESCRIPTION

Figure 1B:
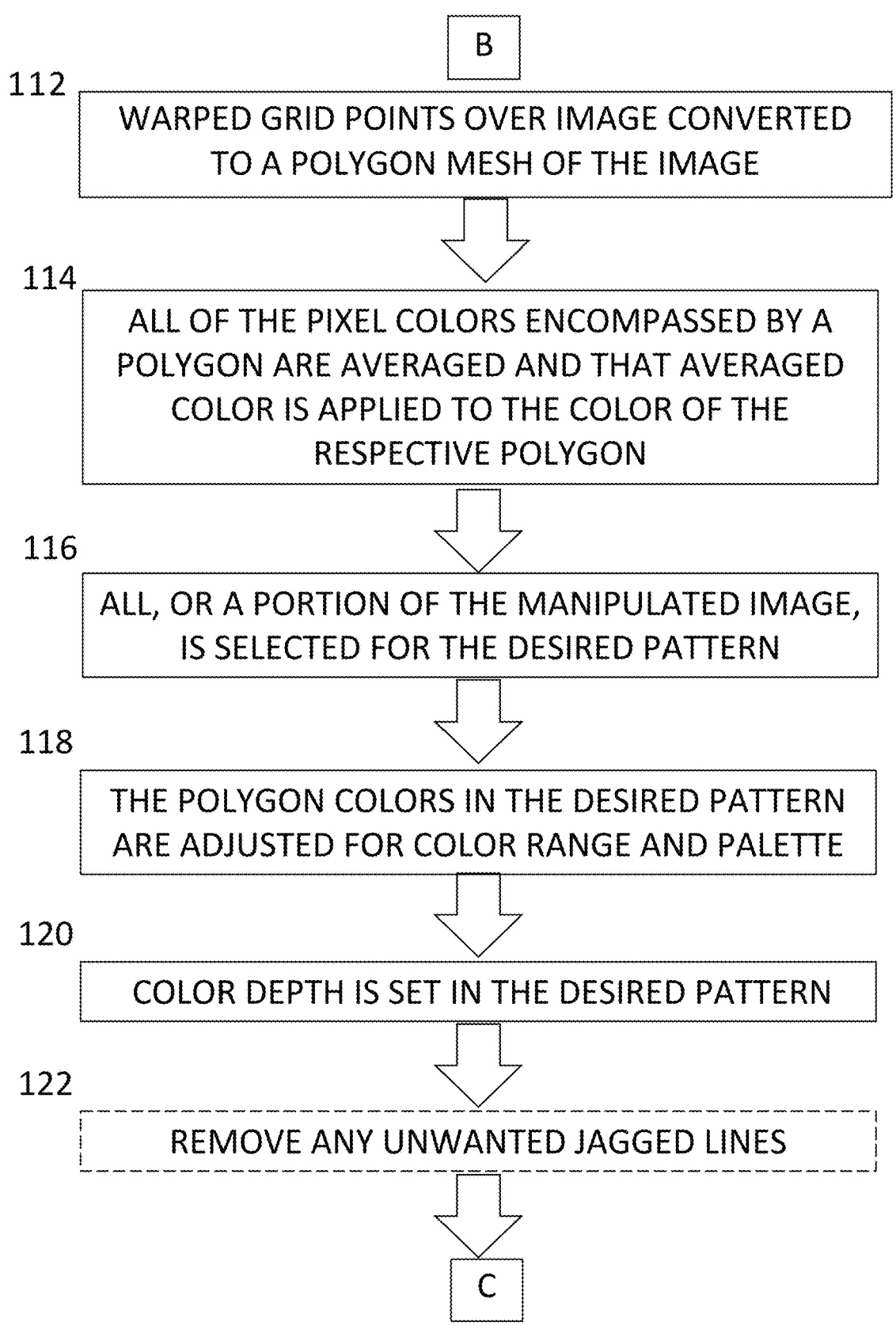
FIG. 1B is a continuation of a flow chart illustrating an example method according to the presently described embodiments.

According to the present exemplary embodiments, a process is provided for simulating real world 3-dimensional depth and color with a 2-dimensional polygon mesh derived from selected areas of a photograph or image, including digital images, examples of which are digital photographs, of desired locations to create patterns to disrupt or blend the human figure, suitable for camouflage, clothing or accessories for those locations, whether fabric, print or electronic. The pattern can be tailored to any specific area from an available image, e.g., a digital image or photograph, and can be adjusted for color range and depth, as well as pattern size to address the necessary fine detail perception of the intended subject.

With current technology, a vast majority of camouflage patterns originate as a digital image, whether an object, group of objects or a scene. In this environment, there is much less incentive for an artist to create an original painting as the basis for the camouflage pattern. The process according to the presently described embodiments is applied to an image (e.g., a digital image) of a scene, landscape or object of some type, and converts the image to a polygon mesh of the image. The polygon mesh can be adjusted to finer or larger polygons, depending on the desired result. Use of the polygon mesh simulates a 3D appearance. It will be appreciated that use of the polygon mesh has a similar visual impact to viewing an image of a physical 3D mesh, e.g., such as 3D meshes used to create models of objects, in 2D on paper or a screen. As such, unlike prior techniques, this process does not add layers or models on a 2D scene. The color of each polygon is averaged for all of the colors in the area that each polygon represents. Then, some portion of the polygon mesh is selected. The reason for selecting only a portion of the image is that it is more advantageous to generate a camouflage pattern replicating, for example, a tree or smaller element in the image rather than a camouflage pattern replicating a whole forest or broader area. This selected portion is then used for the pattern.

An advantage of the presently described embodiments is that this simulated 3D can fool the eye, as well as break up the human form. Additionally, most game animals see in a different spectrum than humans and do not see fine detail as well as humans. Movement is what is most perceptible to game animals. So, the presently described embodiments do not need to add digitization (which is meant to hide humans from night vision and add fine detail) or various splotches or layers of images of plants or objects, either 2D or 3D models on some type of existing scene as in the prior art. (Think Mossy Oak, etc.). Although the process can create camo for specific geographic terrains, based upon an image of the area, it is not so limited. It can be used to create patterns suitable for camouflaging people or objects against any backdrop or in any environment.

With reference to FIG. 1A, an exemplary method begins with selecting 102 a real-world scene, other worldly scene, landscape, AI generated image, or an object of some type. Then, the method includes acquiring 104 an image of the selection. The image may take a variety of forms but, in at least one form, the image is a raster image. Of course, it will be appreciated that selecting an object (at 102) and acquiring an image (at 104) may be performed as a single activity of simply selecting an image, e.g., a raster image, of an object for which such an image already exists. The image may also be created by Artificial Intelligence (AI) methods. The image may also start as a vector drawing, that must first be saved as a raster image, which is existing functionality in vector drawing applications, as the process manipulates the pixels of a raster image. In a particular embodiment, the image manipulation, e.g., of a raster image, may be adjusted 106 to ultimately produce finer or larger polygons later in the process.

Next, the image, e.g., the raster image, which, in at least one form, comprises a grid of pixels having a fixed length and height, with each pixel containing location and color data, is manipulated by selecting contour points on the pixel grid, with more points selected for smaller contours for a previously indicated finer polygon selection, or less points selected for larger contours for a previously indicated larger polygon selection. Those points will be connected as the vertices of various polygons. This manipulation 108 for active contours may be achieved through functional minimization for image segmentation using, for example, an initial cartesian grid. It will be understood that any of a variety of known image segmentation techniques may be used. Use of a cartesian grid is merely an example. Referring back to FIG. 1A, the cartesian grid is iteratively warped 110 until the grid points reach the image contours.

Next, with reference to FIG. 1B, the warped grid points that overlay the image are converted 112 to a polygon mesh of the image which, in at least one form, simulates a 3D appearance. Then, using a manual or automatic process, the pixel colors are averaged 114 within the area encompassed by each polygon, and that polygon is assigned that average color. That is, all of the pixel colors encompassed by a polygon are averaged and that averaged color is applied to the color of the respective region. All, or a portion of the manipulated image, is selected 116 for the desired pattern, typically square. Polygon colors in the desired pattern are then adjusted 118 for color range and palette. In a particular embodiment, the color depth is set in the desired pattern 120 according to specifications set by vendors, including, but not limited to CMYK and RGB. In some embodiments, the method may require the removal of 122 any unwanted jagged lines.

Figure 1C:
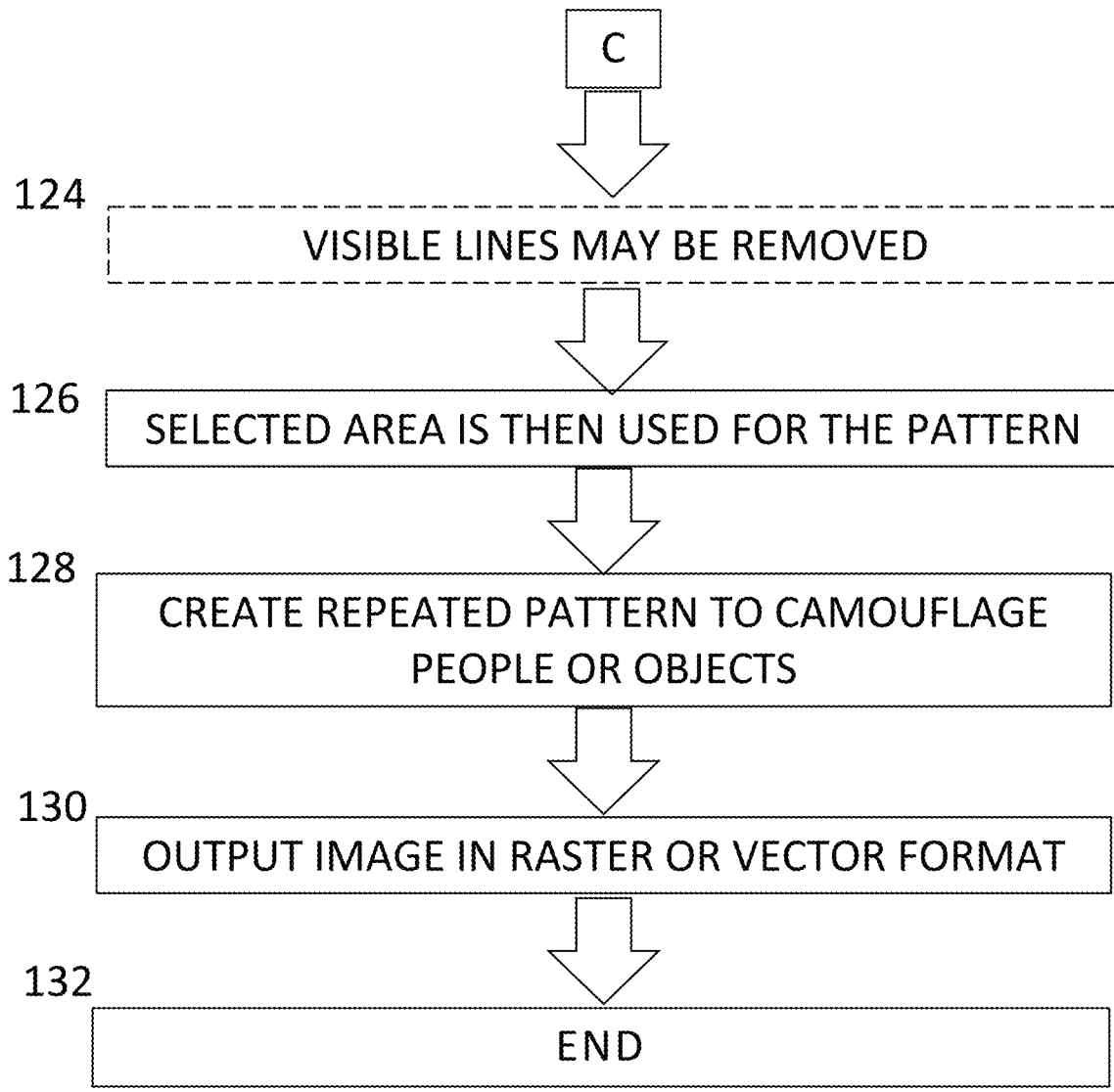
FIG. 1C is a continuation of a flow chart illustrating an example method according to the presently described embodiments.

Then, with reference to FIG. 1C, visible lines can be removed 124 allowing the remaining polygons to touch without visible separation or can remain in place or be enhanced for differing pattern appearance. The selected area is then used 126 for the pattern. In some embodiments, the selection is based which area best fools the eye (human or animal) with simulated 3D. Next, the method includes creating 128 a repeated pattern to camouflage people or objects. In particular embodiments, the method can create camouflage specific to particular terrains.

Finally, the image is output 130. The output can take a variety of forms. However, in at least one form, the resultant image or pattern can be raster (examples: PNG, JPG, BMP, TIFF) or raster converted to vector (examples: SVG, AI, EPS, PDF) by manual or automated methods, according to vendor specifications. The most common file formats are raster: PNG (Portable Network Graphics) and vector: AI (Adobe Illustrator Artwork) files.

Then, the method ends 132.

It should be appreciated that the method 100 of FIGS. 1A-1C is merely an example of a technique according to the presently described embodiments. Variations and alternative approaches may be employed. For example, in some embodiments, the method may return to any of the previous features 102-132 for a different pattern. Also, any portion of the method may be repeated to achieve different results.

Figure 2:
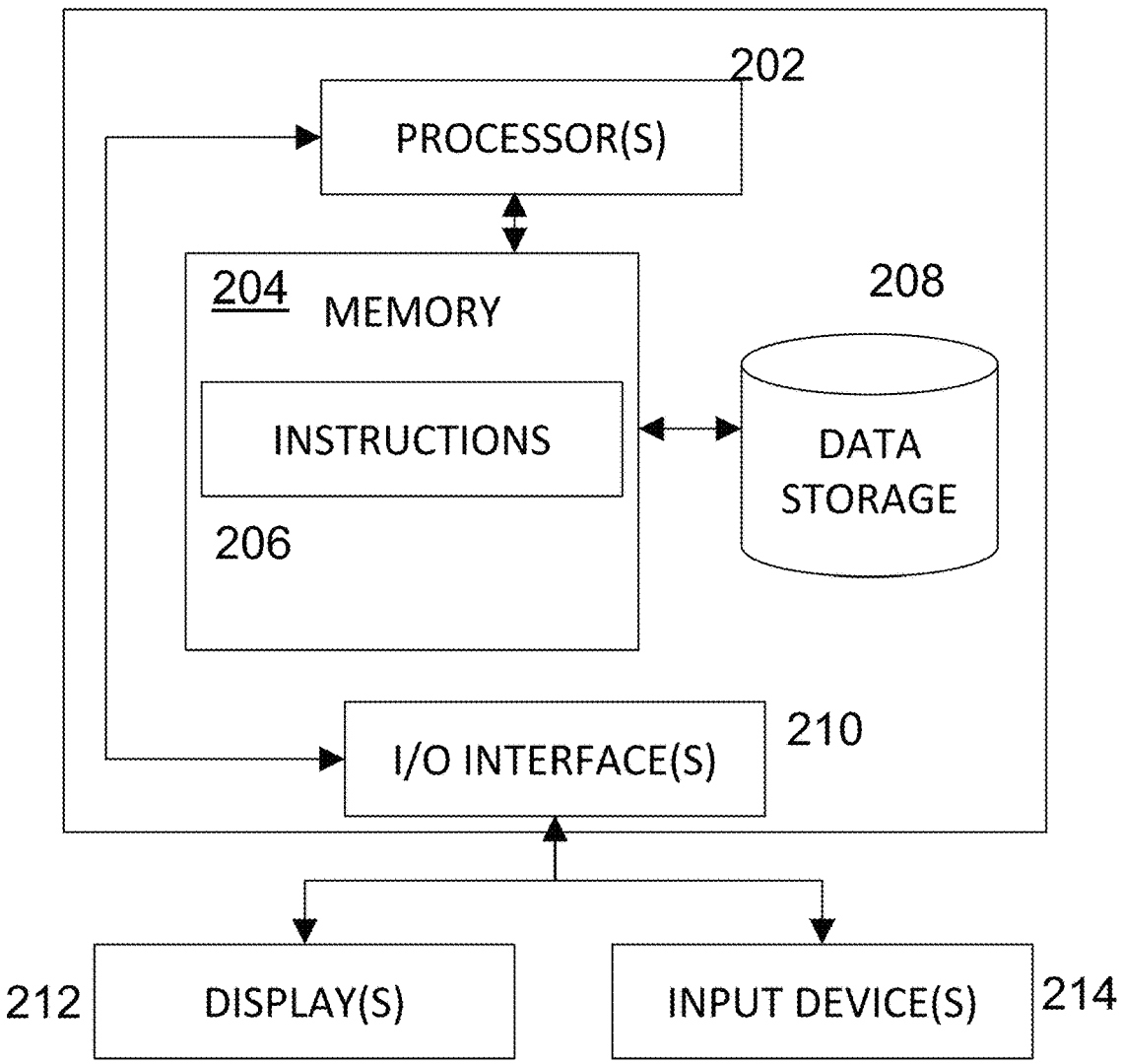
FIG. 2 is a representative illustration of an exemplary system according to the presently described embodiments.

Referring now to FIG. 2, an example system 200 is shown into which the presently described embodiments may be incorporated. It should be appreciated that the system 200 is merely an example—it may take a variety of forms. For example, the above-described methods and/or techniques can be implemented on a system such as system 200 using well-known computer processors, memory units, storage devices, computer software, and other components. As shown in the example representation of such a system, the system 200 includes at least one processor 202, which controls the overall operation of the system 200 by executing computer program instructions 206 which define such operation. The computer program instructions may be stored in at least one storage device or memory 204 (e.g., a magnetic disk or any other suitable non-transitory computer readable medium or memory device) and loaded into another memory (not shown) (e.g., a magnetic disk or any other suitable non-transitory computer readable medium or memory device), or another segment of memory 204, when execution of the computer program instructions is desired. Thus, the steps of the methods described herein (such as, for example, method 100 of FIGS. 1A-1C) may be defined by the computer program instructions 206 stored in the memory 204 and controlled by the processor 202 executing the computer program instructions 206.

The software that is used in connection with the presently described embodiments may take a variety of suitable forms. However, examples of tools available (but not limited to) for image manipulation include:

| Software Type | Paid Subscription | Open Source |
|---|---|---|
| Image Software (Raster) | Adobe Photoshop | GIMP |
| Drawing Software (Vector) | Adobe Illustrator | Inkscape |
| Filter plugins | | G'MIC Polygonize* |

It should also be appreciated that code or instructions may be written or developed, or software and/or hardware tools may be developed, to implement the presently described embodiments. Upon a reading and understanding of the presently described embodiments, those of skill in the art will understand suitable approaches to such implementation.

The system 200 may include one or more Input/Output (I/O) interfaces 210 for communicating with other devices such as displays 212 and/or input devices 214 via a network. The input devices 214 of the system 200 may also include a user interface that enables user interaction with various other elements of the system. The user interface may include I/O devices (e.g., keyboard, mouse, speakers, buttons, etc.) to allow the user to interact with the computer.

According to various embodiments, FIG. 2 is an example representation of possible components of a system including a processor for illustrative purposes. Of course, the system may include other components. Also, the system 200 is illustrated as primarily a single device or system. However, the system 200 may be implemented as more than one device or system and, in some forms, may be a distributed system with components or functions suitably distributed in, for example, a network or in various locations.

It will be appreciated that at least one form of the presently described embodiments will include an output interface to transmit the results of the presently described embodiments to a system (not shown) to form or manufacture products embodying and/or manifesting the generated pattern. The output interface or connection may be included in the I/O interfaces 210 or realized as a separate interface or connection (not shown) to the system to form or manufacture products embodying and/or manifesting the generated pattern. Such a system may take any form suitable for a particular application. For example, the system may take the form of a fabric manufacturing system, screen printing system or other system to transfer or repeat the generated pattern on products, clothes, . . . etc. For example, the output of the system, e.g., a repeating pattern, may be printed on a dip transfer film, a fabric, vinyl wrap or other print medium. Also, the repeating pattern may be output to a system to perform direct transfer of the repeating pattern to objects. In another example, the resultant pattern may be projected on a surface such as a wall, etc. In some forms, such a system may comprise a system for generating a simulation of an end product. Various output techniques may be realized for achieving these objectives.

Also, it will be appreciated that the structures and procedures shown above are only a representative example of embodiments that can be used to facilitate embodiments described above. In this regard, the various embodiments described in the examples above may be implemented using any suitable circuitry, hardware, and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to, for example, the processor for execution as is known in the art.

Further, it should also be appreciated that a controller, processor, computing device, client computing device or computer, such as described herein, includes at least one or more processors or processing units and a system memory. The controller may also include at least some form of non-transitory computer readable media. By way of example and not limitation, non-transitory computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the computing arts should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server may generally include an edge server, a plurality of data servers, a storage database (e.g., a large-scale RAID array), and various networking components. It is contemplated that these devices or functions may also be implemented in virtual machines and spread across multiple physical computing devices.

An example implementation of the presently described embodiments is shown in FIGS. 3, 4A-4B, 5, and 6. In these examples, generation of a camouflage pattern for a specific example of terrain and foliage is illustrated. This, of course, could be useful in a variety of different environments.

Figure 3:
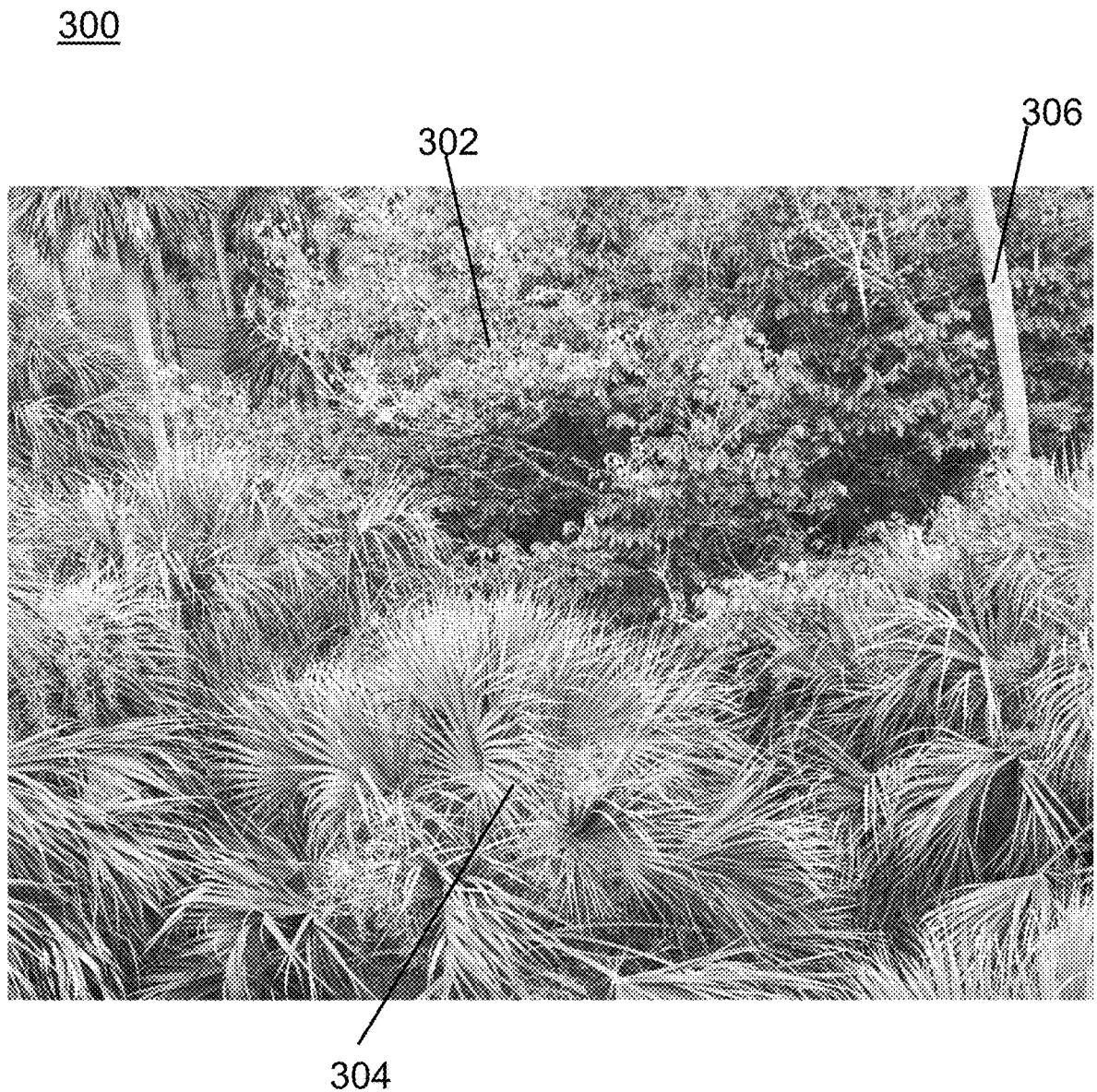
FIG. 3 shows an example image.

With reference now to FIG. 3, an original digital photograph, in a format suitable for the software employed for manipulation, such as, but not limited to PNG, JPG, BMP or TIFF is shown. As a mere example, it should be appreciated that FIG. 3 has a file size of 4.8 MB and was created on an iphone 7 Plus with an X and Y Resolution of 72 pixels per inch. The presently described embodiments, in at least one form, are implemented using color images and/or color processing techniques. However, the images are converted to grayscale for convenience of rendering the depictions in the drawings herein. It should be appreciated that color versions of these drawings are not necessary to gain a full understanding of the presently described embodiments or contemplated variations thereof or alternatives thereto.

Figure 4A:
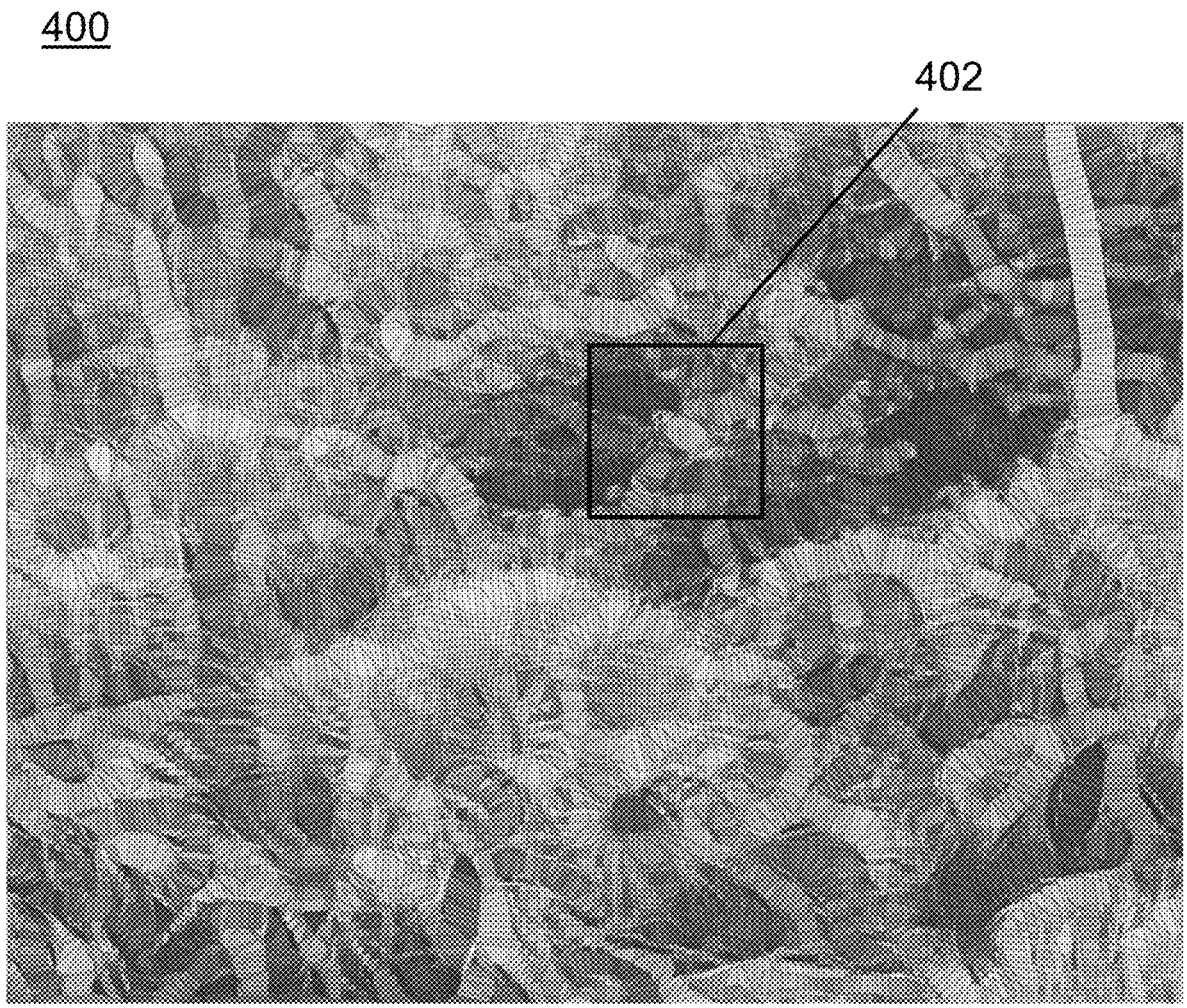
FIG. 4A shows a modified image (FIG. 3) according to the presently described embodiments.
Figure 4B:
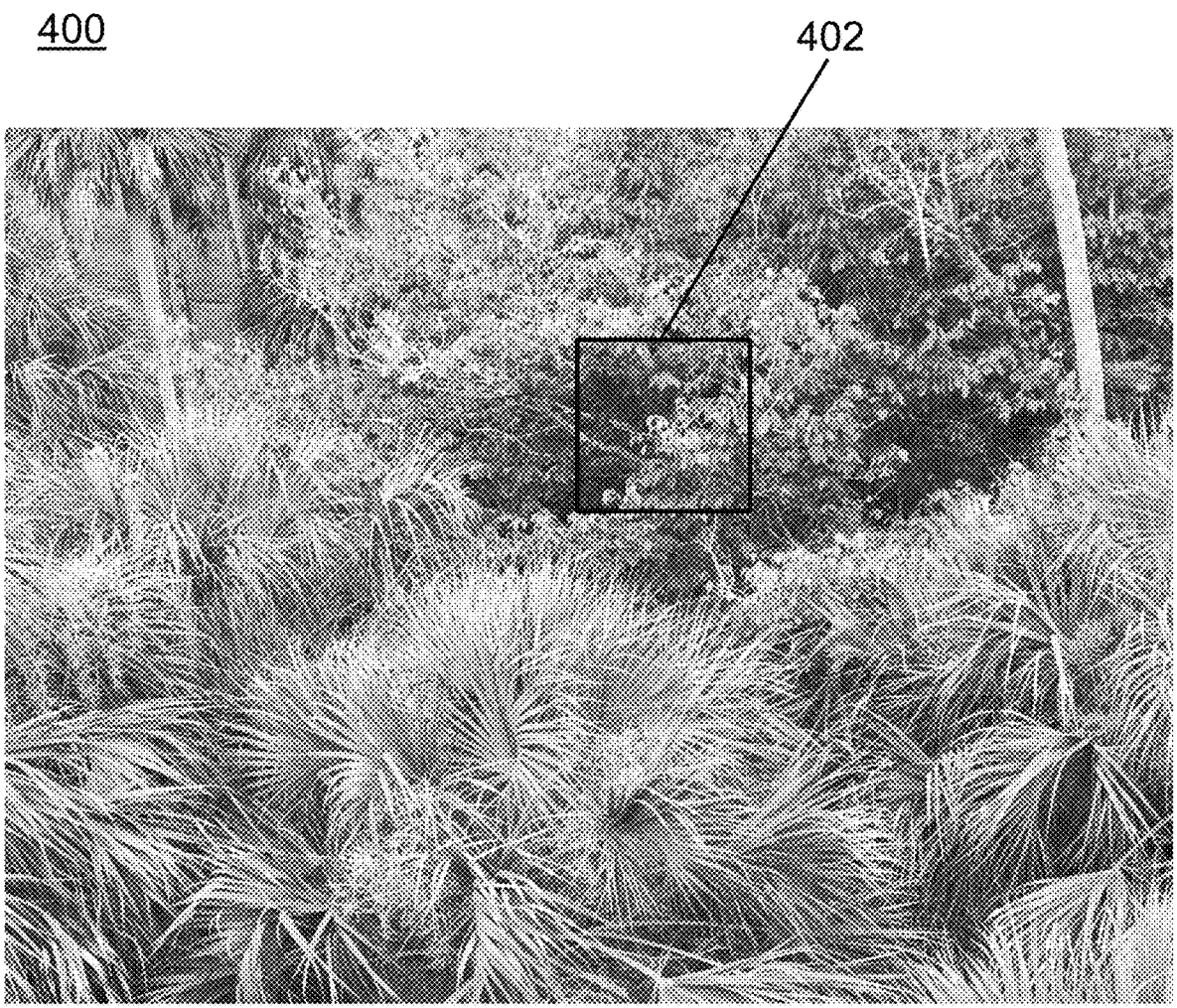
FIG. 4B shows the original image with selected area of FIG. 4A.

With reference to FIGS. 4A and 4B, the image is, for example, manipulated for active contours through functional minimization for image segmentation using an initial cartesian grid which is iteratively warped until the grid points reach the image contours. Any suitable image processing tool, including image processing software tools, may be used for the manipulation for active contours through functional minimization for image segmentation. One example tool is GREY's Magic for Image Computing Polygonize (Energy) filter. However, other existing or custom developed image processing tools or filters can be used. Colorization is achieved by setting each polygon color to the average color of all pixels it covers. All, or a portion of the manipulated image, is selected for the desired pattern, typically square.

FIG. 4A shows the processed or filtered image 400. The outline 402 shows the area of the image selected for the pattern. As noted, it is converted to grayscale for the drawings. For reference, FIG. 4B shows the original image 400 (in grayscale) with outline 402.

Figure 5:
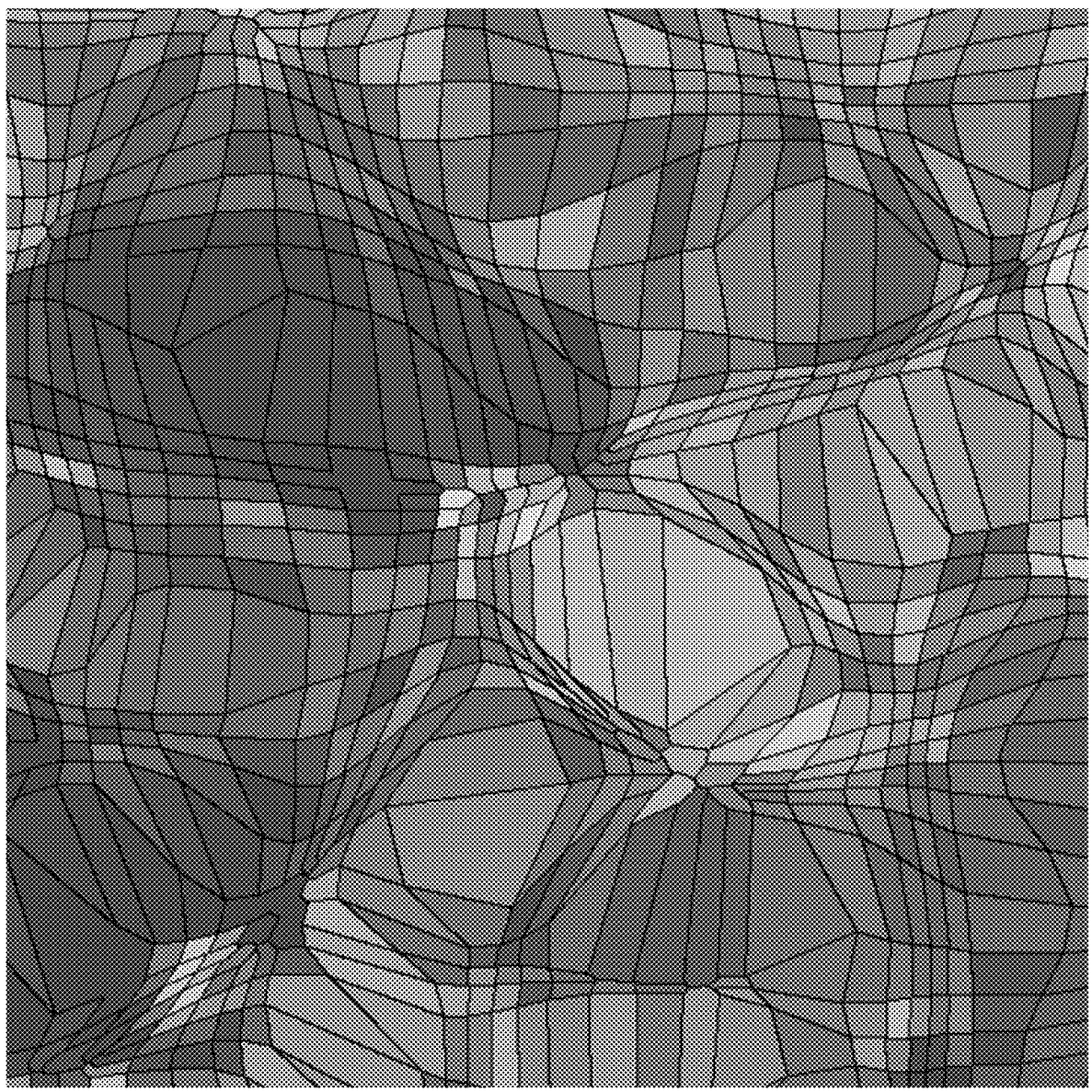
FIG. 5 shows an image according to the presently described embodiments.

With reference to FIG. 5 (again, shown in grayscale in the drawings herein), the polygon colors are adjusted for color range and palette. Color depth is set according to specifications set by vendors, including, but not limited to CMYK and RGB. The manipulated image is adjusted with readily available software tools to remove any unwanted jagged lines. Visible lines can be removed allowing the remaining polygons to touch without visible separation or can remain in place or be enhanced for differing pattern appearance. FIG. 5 shows the area of the image that was selected for the pattern, e.g., outline 402. The image is now sized to 18"×18". Jagged lines shown need cleaned up. It is converted to grayscale for the drawings.

Figure 6:
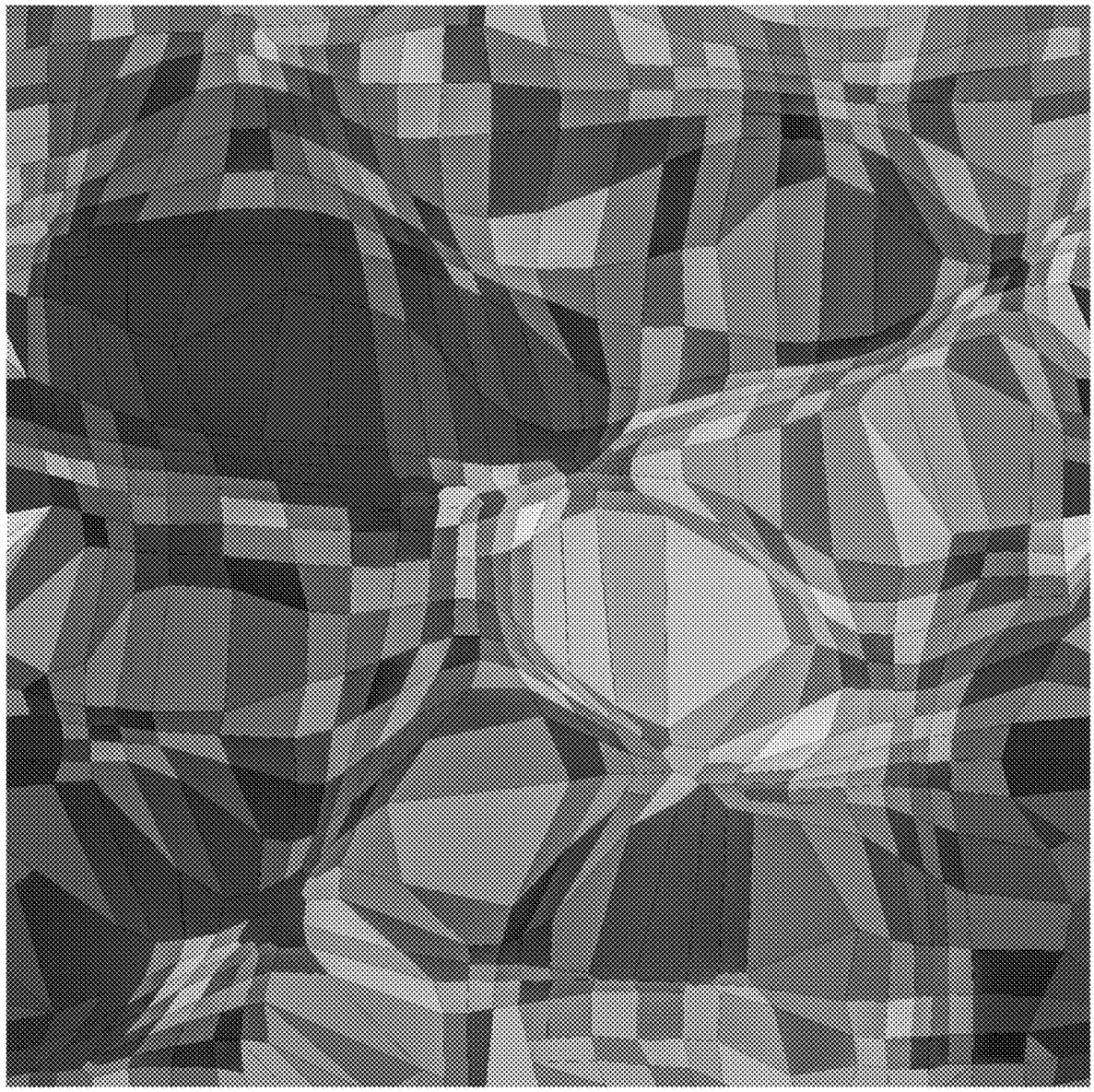
FIG. 6 shows an image according to the presently described embodiments.

With reference to FIG. 6 (again, shown in grayscale in the drawings herein), the four (4) edges of the pattern can be adjusted to create a seamless horizontal and vertical pattern repeat, if desired, or the pattern can stand alone. A typical U.S. pattern repeat size is 18"×18", used for creating 54" wide fabrics. The size, however, is according to vendor specifications, as it can vary. FIG. 6 shows the image selected pattern area in the typical size, i.e., 18"×18". The selection is raster format (PNG) and has the jagged lines cleaned up, the color depth and palette selected, and a Left, Right & Top, Bottom pattern repeat completed. It is converted to grayscale for the drawings.

Thus, the example implementation of the presently described embodiments shown in FIGS. 3, 4A-4B, 5, and 6, relates to generation of a camouflage pattern for a specific example of terrain and/or foliage. The presently described embodiments, of course, could be useful in a variety of different environments and applications. In this regard, for example, patterns can be created for generic purposes, e.g., a photograph of woods or desert for widespread use, or for very specific purposes such as a custom pattern for a very specific location. As noted above, the environments of use may likewise vary from camouflage patterns used to camouflage outdoorsmen and their equipment from game animals to other applications such as, for example, military applications to disguise equipment and personnel from opposing forces or the clothing market to provide a unique basis for fabric design.

In this regard, it will be appreciated that the camouflage pattern generated according to the techniques and/or systems according to, for example, the presently described embodiments may be applied to a variety of items. As mere examples, these items include hats, coats, shirts, pants, socks, pullovers, sweatshirts, weapons, fabrics, tarps, covers, blankets, sheets, equipment, gloves, helmets, footwear, tents, bags, duffel bags, backpacks, purses, luggage, sacks, sling bags, carriers or walls.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for developing a camouflage pattern comprising:
   capturing, receiving or selecting an image;
   manipulating the image for active contours through functional minimization using an initial cartesian grid;

iteratively warping the initial cartesian grid until grid points reach the contours;

converting the warped cartesian grid to a polygon mesh of the image;

averaging all of the pixel colors encompassed by each polygon to represent the color of the respective polygons, selecting a portion of the image;

from the selected portion, adjusting polygon colors for range and palette;

setting color depth;

creating a repeating pattern of the selected portion; and outputting the repeating pattern.

2. The method as set forth in claim 1, wherein the image is a raster image.

3. The method as set forth in claim 1, wherein the outputting comprises outputting the repeating pattern in at least one of raster format or vector format.

4. The method as set forth in claim 1, further comprising printing the repeating pattern on a dip transfer film, a fabric, vinyl wrap, or other print medium or performing direct transfer to objects.

5. A system comprising:

at least one processor; and, at least one memory having stored thereon instructions or code that, when executed by the at least one processor, causes the system to:

manipulate an image for active contours through functional minimization using an initial artesian grid;

iteratively warp the initial cartesian grid until grid points reach the contours;

convert the warped cartesian grid to a polygon mesh of the image;

average all of the pixel colors encompassed by each polygon to represent the color of the respective polygons, select a portion of the image;

from the selected portion, adjust polygon colors for range and palette;

set color depth;

create a repeating pattern of the selected portion; and output the repeating pattern.

6. The system as set forth in claim 5, wherein the image is a raster image.

7. The system as set forth in claim 5, wherein the repeating pattern is in at least one of raster format or vector format.

8. The system as set forth in claim 5, wherein the repeating pattern is output to a system to print the repeating pattern on a dip transfer film, a fabric, vinyl wrap, or other print media or perform direct transfer to objects.

9. A non-transitory computer readable medium having computer executable instructions stored thereon that, when executed, cause a system to perform:

capturing, receiving or selecting an image;

manipulating the image for active contours through functional minimization using an initial cartesian grid;

iteratively warping the initial cartesian grid until grid points reach the contours;

converting the warped cartesian grid to a polygon mesh of the image;

averaging all of the pixel colors encompassed by each polygon to represent the color of the respective polygons, selecting a portion of the image;

from the selected portion, adjusting polygon colors for range and palette;

setting color depth;

creating a repeating pattern of the selected portion; and outputting the repeating pattern.

10. The non-transitory computer readable medium as set forth in claim 9, wherein the image is a raster image.

11. The non-transitory computer readable medium as set forth in claim 9, wherein the outputting comprises outputting the repeating pattern in at least one of raster format or vector format.

12. The non-transitory computer readable medium as set forth in claim 9, wherein the system is further caused to perform printing the repeating pattern on a dip transfer film, a fabric, vinyl wrap, or other print medium or perform direct transfer to objects.

13. An item having thereon a camouflage pattern developed by a method comprising:

capturing, receiving or selecting an image;

manipulating the image for active contours through functional minimization using an initial cartesian grid;

iteratively warping the initial cartesian grid until grid points reach the contours;

converting the warped cartesian grid to a polygon mesh of the image;

averaging all of the pixel colors encompassed by each polygon to represent the color of the respective polygons, selecting a portion of the image;

from the selected portion, adjusting polygon colors for range and palette;

setting color depth;

creating a repeating pattern of the selected portion; and outputting the repeating pattern.

14. The item as set forth in claim 13, wherein the item comprises at least one of a hat, coat, shirt, pants, socks, pullover, sweatshirt, weapon, fabric, tarp, blanket, cover, sheet, equipment, gloves, helmet, footwear, tent, bag, duffel bag, backpack, purse, luggage, sack, sling bag, carrier, or wall.

* * * * *